April 26, 1932.  E. GENTIL  1,855,955
PROCESS AND APPARATUS FOR DELIVERING GLASS TO A LEER
Filed Aug. 14, 1930  2 Sheets-Sheet 1
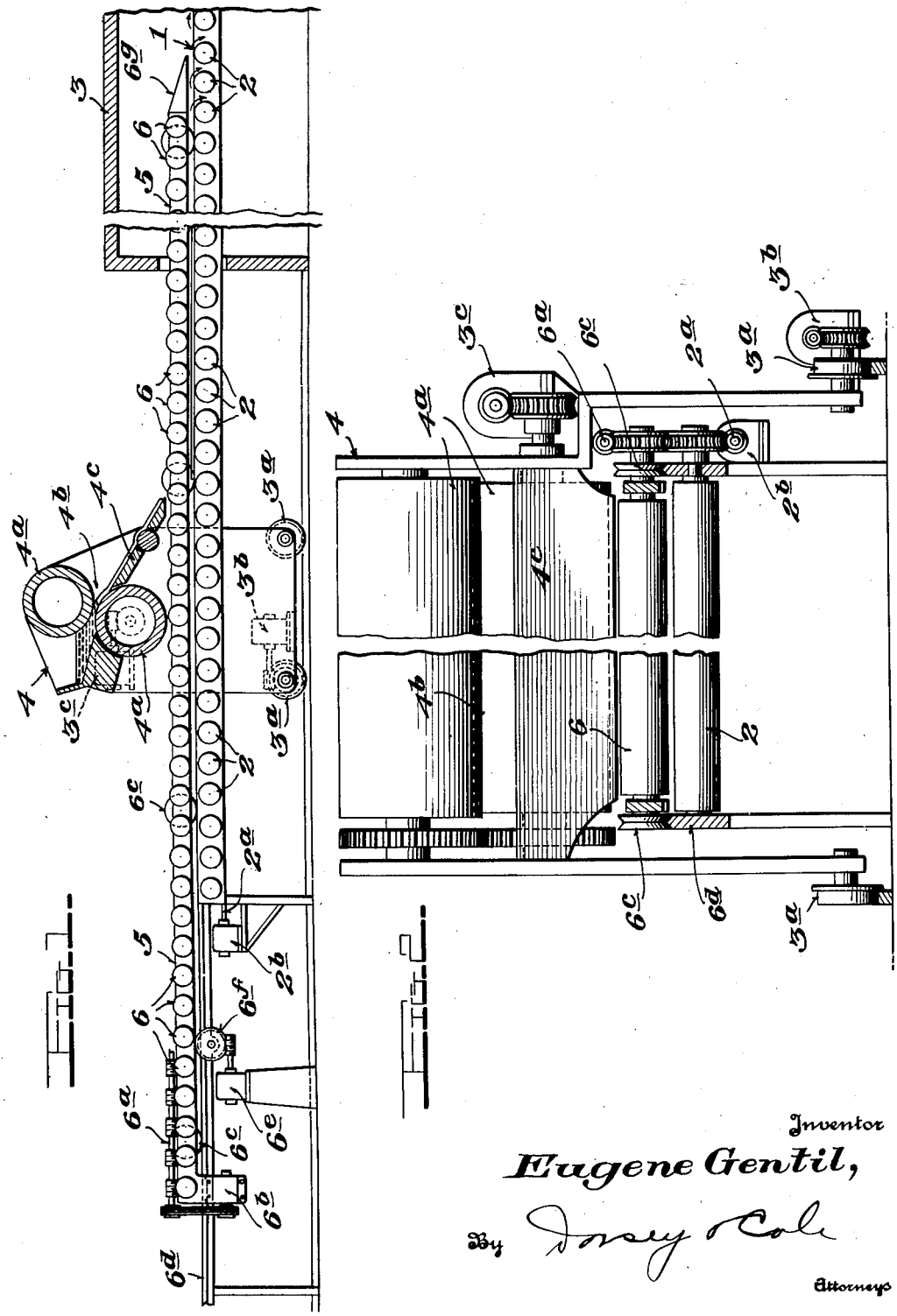
Inventor
Eugene Gentil,
By Dorsey & Cole
Attorneys April 26, 1932.  E. GENTIL  1,855,955
PROCESS AND APPARATUS FOR DELIVERING GLASS TO A LEER
Filed Aug. 14, 1930  2 Sheets-Sheet 2
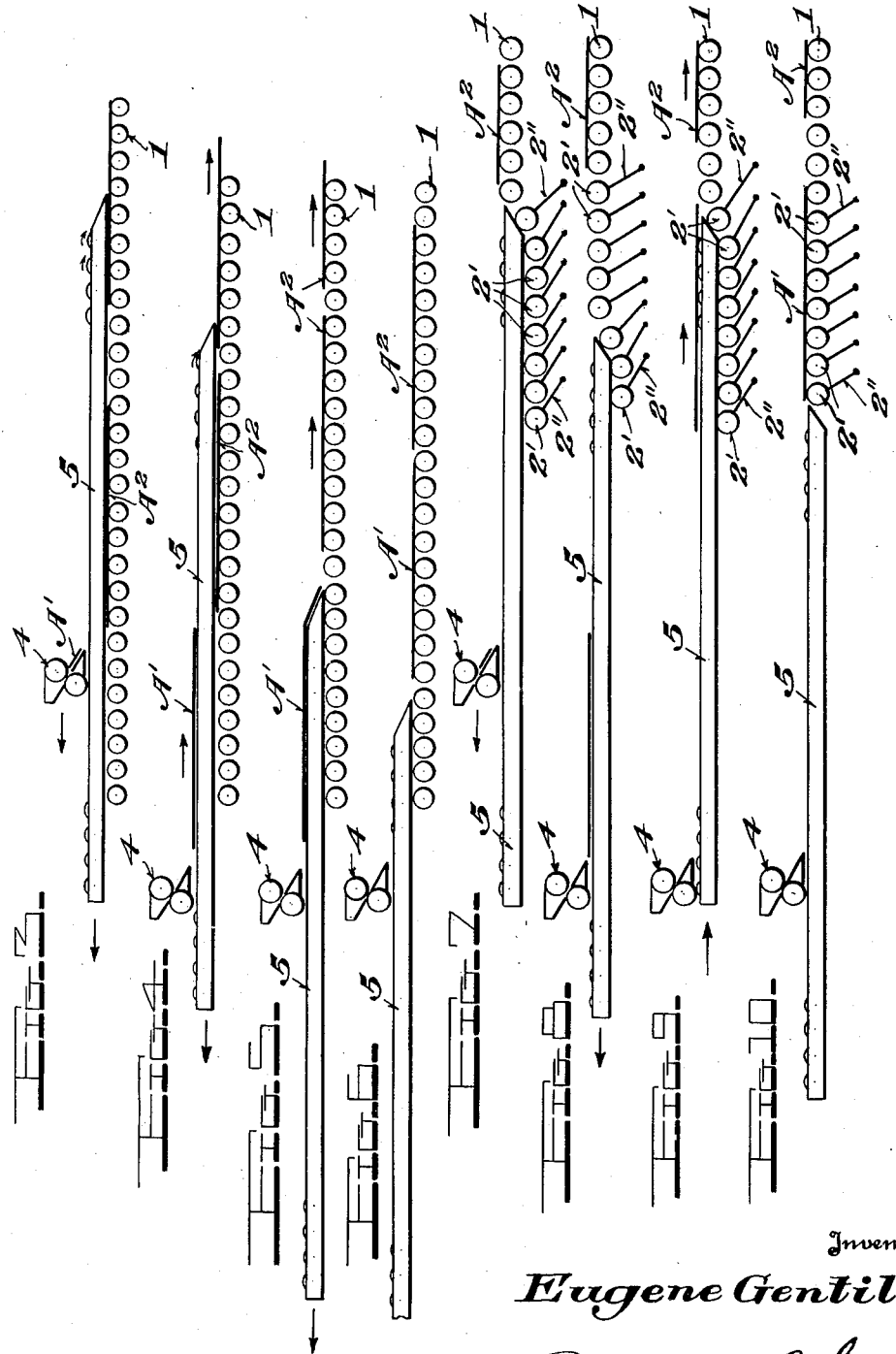
Inventor
Eugene Gentil,
By Dorsey & Cole
Attorneys Patented Apr. 26, 1932

1,855,955

UNITED STATES PATENT OFFICE

EUGENE GENTIL, OF PARIS, FRANCE, ASSIGNOR TO THE AMERICAN BICHEROUX COMPANY, OF WILMINGTON, DELAWARE

PROCESS AND APPARATUS FOR DELIVERING GLASS TO A LEER

Application filed August 14, 1930. Serial No. 475,263.

The object of this invention is to provide for the reception of glass sheets from an intermittent forming machine and the delivery thereof to a leer conveyor having a speed lower than that of the speed of sheet formation, in such a manner that the sheet is received from the forming machine on a bed, and is delivered from the bed to the leer conveyor by which it is carried through the leer at leering speed, all without reducing the speed of forward movement of the sheet below that which it had at the time of formation.

For this purpose it comprises delivering the sheet from a rearwardly moving forming machine onto a travelling carriage having a sheet receiving surface formed of rollers, and delivering the sheet from the carriage to the leer conveyor, the reception of the sheet on the carriage, and the feed therefrom to the leer conveyor being effected while the carriage is moving backwardly in respect to the line of travel of the glass sheet, and mechanism whereby such steps may be carried out, and in the combination of the parts of which it is composed as will be hereinafter described and claimed.

Referring to the accompanying drawings in which corresponding parts are designated by corresponding marks of reference,—

Figure 1 is a showing of a structure embodying my invention, the parts being represented in the position they occupy at about the commencement of the formation of a sheet.

Figure 2 is a vertical cross section thereof.

Figures 3, 4, 5 and 6 are series of diagrammatic views illustrating different positions assumed by the several parts shown in Figures 1 and 2, Figure 3 showing the parts in the position shown in Figure 1, Figure 4 showing the same at about the time of the completion of the formation of the sheet, Figure 5 showing the same slightly after the commencement of the delivery of the sheet from the carriage to the leer conveyor; and Figure 6 showing the same slightly after the completion of such delivery.

Figures 7, 8, 9 and 10 are similar views representing the preferred form of apparatus at the same times as are represented in Figures 3 to 6, respectively.

In all of the figures, 1 is a leer conveyor, preferably formed of constantly driven rollers 2, by which the glass sheets are fed through the leer 3. 4 is a forming machine preferably of the Bicheroux type, whose speed of formation for the sheet is higher than the leering speed, and is provided with sheet-forming rollers $4^a$ having a forming pass $4^b$ between them. The sheet formed at this pass feeds down the apron $4^c$ on to a carriage 5, whose glass-receiving surface is formed of a series of driven rollers 6. The forming machine and the carriage are each mounted for movement in the line of feed of the sheets.

As shown in Figures 1 and 2, the rollers 2 of the leer conveyor may be driven at a suitable constant peripheral speed to feed a sheet thereon forwardly through the shaft $2^a$ and motor $2^b$. The rollers 6 of the carriage may be driven at a uniform and higher speed, in a similar diameter by the shaft $6^a$ and motor $6^b$. The carriage may be provided with wheels $6^c$ moving on tracks $6^d$, and be shifted thereon by the reversible motor $6^e$, and toothed wheel $6^f$, and the forming machine may be shifted on its wheels $3^a$ by the reversible motor $3^b$, it having a separate motor $3^c$ for driving its forming rolls.

In the form of the invention shown in Figs. 1 to 6, the carriage moves in a plane located above that of the leer conveyor rollers and at times is above the initial rollers of that conveyor, the forward end of the carriage terminating in an incline $6^g$ down which the glass sheet slides when fed from the carriage onto the leer conveyor. The relative arrangement of the carriage and leer conveyor is shown in French Patent No. 672,155, to which reference is made for further understanding, if necessary.

With the parts arranged as above, glass is fed to the forming machine and the formation of the sheet commenced (see Figures 1 and 3). At this time the machine 4 and the carriage 5 are put in motion rearwardly, the rollers 6 of the carriage being in rotation to feed the sheet forwardly as received thereon. We may presume that the proper leering speed is 5 ft. a minute, and that the rate of sheet formation is 60 ft. a minute; that the forming machine is moved rearwardly at a speed of 55 ft. a minute; that the carriage is moved rearwardly at the speed of 35 ft. a minute; and that the carriage rollers 6 have a peripheral speed of 40 ft. a minute. Under such conditions the sheet A' will be laid evenly on the receiving carriage, and during the time it is laid thereon its forward end will be advanced in respect to the carriage by the rollers at the rate of 40 ft. a minute, and will be moved rearwardly by the movement of the carriage at the rate of 35 ft. a minute. (Compare Figures 3 and 4). Thus while the sheet is being shifted on the rollers 6 at a speed greater than leering speed its speed of motion in respect to the leer is 5 ft. a minute, i. e., the speed of leering. The sheet will be continued to be fed forward at this rate on the carriage during this rearward movement of the carriage until finally its forward end will be fed over the forward end thereof and down on the leer conveying rollers. (See Figure 5). As the speed of absolute forward motion of the sheet (5 feet a minute) is the same as the peripheral speed of the leering rollers, the sheet will be transferred to the latter without either stretching or buckling and when so completely transferred (see Figure 6) will be carried through the leer at this speed. When the sheet has been completely delivered from the carriage the latter may be moved forwardly, its forward end passing, if desired, over the sheet A² previously delivered to the leer conveyor. After the carriage has been so advanced the formation of a new sheet may be started,—(see Figures 3 and 4). If the carriage has been moved over the previously formed sheet, the forward end of the second sheet A' may be laid on the leer conveyor in close proximity to the trailing end of the previous sheet A²,—(see Figure 5).

In lieu of running the carriage over the leer conveyor, as above described, the delivery from the carriage to the leer may be made in the manner shown in Figures 7, 8, 9 and 10. The structure there shown is fully described in the patent of V. M. Dorsey, No. 1,782,716. Briefly stated, it comprises mounting a certain number of the initial rollers 2' of the leer conveyor on radius arms 2" pivoted at their lower ends, so that such rollers may be depressed by the forward end of the carriage as its moved forward, and will rise to their upper position in the plane of the carriage rollers and of the other rollers of the leer conveyor as the carriage moves rearwardly, these rollers being driven at the same speed as the other rollers of the leer conveyor. With the motions of the several parts in the direction and of the value before stated, the delivery from the carriage to the leer conveyor will also be the same as above stated, except that the sheet will not be bent in being delivered down an incline end of the carriage, and except that the sheets will not be stacked as close together.

However, the spacing between the sheets which would result from such motions may be much reduced if, after the sheet is fully formed, and while it is being fed forwardly on the carriage, but has not reached the forward end thereof (see Fig. 8), the carriage is reversed in its motion and advanced in the position it occupied at the beginning of sheet formation (compare Figs. 7 and 9), so that it is at this last position when the sheet starts to feed over the forward end thereof, and is then moved rearwardly again during the delivery of the sheet to the leer conveyor, which motion may be at the rate it moved rearwardly at the time of sheet formation.

In all of the several embodiments of the invention above described, it will be seen that the sheet is shifted on and in respect to the transverse supports formed by the rollers of the carriage at a much higher speed than it is shifted on the leer rollers; and that this high rate of shift commences as the sheet is delivered from the forming machine and continues until the sheet is delivered to the leer conveyor when its rate of shift is reduced to the speed proper for leering, and that this change in the rate of shift is not accompanied by any reduction of the speed of forward motion of the sheet under that at which the sheet has at commencement of its formation. This is of importance, as variations in the velocity of sheet creates strain therein leading to breakage. In the system represented in Figures 3 to 6, the sheet has a uniform motion forward from its time of origin until it passes through the leer. In that represented in Figures 7 to 10 the sheet is for purposes of close stacking, accelerated in its forward motion, and then has its speed reduced to its initial and final speeds.

The high speed of shift on and in respect to the rollers of the carriage on its delivery thereto and immediately thereafter, prevents the sheet sagging while still hot.

In the above described methods of operation, it will be found that save for such differences as may be introduced to stretch the sheet or to compensate for expansion, the speed of backward motion of the machine will equal the difference between the speed of sheet formation and that of the leer conveyor, and that the speed of backward motion of the carriage will equal the difference between the peripheral speed of the carriage rollers and the leer rollers. The peripheral speed of the carriage rollers will be selected with the end of best handling the hot glass, and the carriage speed will be such as to satisfy the last equation with the roller speed that is selected.

Having thus described my invention what I claim is:—

1. The hereinbefore described method of delivering a glass sheet from a forming machine to a leer conveyor by moving the sheet forwardly at a speed less than the speed of formation thereof, which comprises moving the forming machine rearwardly during the formation of the sheet, delivering the sheet as formed on a rearwardly moving bed, shifting the sheet forwardly on the bed as it is received thereon and until it is delivered therefrom to the leer conveyor, and moving the bed rearwardly during the time of the last named delivery.

2. The hereinbefore described method of delivering a glass sheet from a forming machine to a leer conveyor by moving the sheet forwardly at a speed less than the speed of formation thereof, which comprises moving the forming machine rearwardly during the formation of the sheet, delivering the sheet as formed on a rearwardly moving bed, shifting the sheet forwardly on the bed as it is received thereon and until it is delivered therefrom to the leer conveyor, and moving the bed rearwardly during the time of the last named delivery, the rate of shift on the carriage being constant and equal to the rate of movement of the leer conveyor.

3. The hereinbefore described method of delivering a glass sheet from a forming machine to a leer conveyor by moving the sheet forwardly at a speed less than the speed of formation thereof, which comprises moving the forming machine rearwardly during the formation of the sheet, delivering the sheet as formed on a rearwardly moving bed, shifting the sheet forwardly on the bed as it is received thereon, and until it is delivered therefrom to the leer conveyor, and moving the bed rearwardly during the time of the last named delivery, the rate of shift on the carriage being constant and equal to the rate of movement of the leer conveyor, and the speed of rearward motion of the carriage being the same during the reception of a sheet thereon as during the delivery of a sheet therefrom.

4. The hereinbefore described method of delivering a glass sheet from a forming machine to a leer conveyor by moving the sheet forwardly at a speed less than the speed of formation thereof, which comprises moving the forming machine rearwardly during the formation of the sheet, delivering the sheet as formed on a rearwardly moving bed, shifting the sheet forwardly on the bed as it is received thereon and until it is delivered therefrom to the leer conveyor, and moving the bed rearwardly during the time of the last named delivery, and moving the bed forwardly between the time of the reception of the sheet thereon and its delivery therefrom.

5. The hereinbefore described method of delivering a glass sheet from a forming machine to a leer conveyor by moving the sheet forwardly at a speed less than the speed of formation thereof, which comprises moving the forming machine rearwardly during the formation of the sheet, delivering the sheet as formed on a rearwardly moving bed, shifting the sheet forwardly on the bed as it is received thereon and until it is delivered therefrom to the leer conveyor, moving the bed rearwardly during the time of the last named delivery, and moving the bed forwardly between the time of the reception of the sheet thereon and its delivery therefrom, the rate of shift on the carriage being constant and equal to the rate of movement of the leer conveyor.

6. The hereinbefore described method of delivering a glass sheet from a forming machine to a leer conveyor by moving the sheet forwardly at a speed less than the speed of formation thereof, which comprises moving the forming machine rearwardly during the formation of the sheet, delivering the sheet as formed on a rearwardly moving bed, shifting the sheet forwardly on the bed as it is received thereon and until it is delivered therefrom to the leer conveyor, moving the bed rearwardly during the time of the last named delivery, and moving the bed forwardly between the time of the reception of the sheet thereon and its delivery therefrom, the rate of shift on the carriage being constant and equal to the rate of movement of the leer conveyor, and the speed of rearward motion of the carriage being the same during the reception of a sheet thereon as during the delivery of a sheet therefrom.

7. The hereinbefore described method of delivering a glass sheet from a forming machine to a leer conveyor by moving the sheet forwardly at a speed less than the speed of formation thereof, which comprises moving the forming machine rearwardly during the formation of the sheet, delivering the sheet as formed to a series of rearwardly moving supports, and moving the sheet forwardly on and in respect to such supports onto a conveyor, all while maintaining the forward speed of the sheet at least equal to the speed of forward movement thereof when formed, and while maintaining the movement of the sheet in respect to its support greater than its speed of movement on the conveyor.

8. In a device of the character described, the combination with a leer conveyor, of a forming machine, a carriage receiving sheets from the forming machine as they are formed, and delivering them to the leer conveyor, means for shifting the sheets on the carriages, and means for moving the forming machine rearwardly during the formation of the sheets, and for moving the carriage rearwardly during the formation of the sheets and during the delivery thereof to the leer conveyor.

9. In a device of the character described, the combination with a leer conveyor, of a forming machine, a carriage receiving sheets from the forming machine as they are formed, and delivering them to the leer conveyor, means for shifting the sheets forwardly on and in respect to the carriage at a higher speed than the speed at which they will be fed by the conveyor when delivered thereto, means for moving forming machine rearwardly during the formation of the sheets at a speed equal to the difference between the speed of formation and the speed of the leer conveyor, and means for moving the carriage rearwardly during the formation of the sheets and during the delivery thereof to the leer conveyor at a speed equal to the difference between the speed at which the plate is shifted on and in respect to the carriage and the speed of the leer conveyor.

10. In a device of the character described, the combination with a leer conveyor, of a forming machine, a carriage receiving sheets from the forming machine as they are formed and delivering them to the leer conveyor, means for shifting the sheets forwardly on and in respect to the carriage at a higher speed than the speed at which they will be fed by the conveyor when delivered thereto, means for moving forming machine rearwardly during the formation of the sheets at a speed equal to the difference between the speed of formation and the speed of the leer conveyor, means for moving the carriage rearwardly during the formation of the sheets and during the delivery thereof to the leer conveyor at a speed equal to the difference between the speed at which the plate is shifted on and in respect to the carriage and the speed of the leer conveyor, and means for moving the carriage forwardly between the completion of the reception of a sheet thereon and the beginning of the delivery of such sheet to the leer conveyor.

11. In a device of the character described, the combination with a leer conveyor, of a forming machine, a carriage receiving sheets from the forming machine as they are formed and delivering them to the leer conveyor, a series of rollers on the carriage forming the glass receiving surface thereof, means for moving the machine rearwardly during the formation and delivery of a sheet at a speed equal to the difference between the speed of formation of the sheet and the speed of movement due to the leer conveyor, means for moving the carriage rearwardly during the reception of a sheet thereon and during the delivery of the sheet therefrom, and means for driving the rollers on the carriage at a constant peripheral speed, equal to the sum of the backward motion and the speed due to the leer conveyor, the speed of motion of the carriage in receiving and delivering a sheet being equal to the difference between the peripheral speed of the rollers on the carriage and the speed due to the leer conveyor.

In testimony whereof I hereunto affix my signature.

EUGENE GENTIL.